US006213506B1

United States Patent
Swann et al.

(10) Patent No.: US 6,213,506 B1
(45) Date of Patent: Apr. 10, 2001

(54) ACTUATABLE KNEE BOLSTER

(75) Inventors: Timothy A. Swann, Mesa; Vincent M. Mramor, Chandler; Kevin M. Brown, Mesa; Roy D. Van Wynsberghe, Mesa; Bryan W. Shirk, Mesa; Eric C. Erike, Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/483,160

(22) Filed: Jan. 14, 2000

(51) Int. Cl.$^7$ .................................................. B60R 21/04
(52) U.S. Cl. ............................................................. 280/751
(58) Field of Search .................................. 280/732, 751, 280/752, 753, 728.1, 730.1, 741, 748; 102/275.1

(56) References Cited

U.S. PATENT DOCUMENTS

| 3,768,830 | * | 10/1973 | Hass ...................................... 280/753 |
| 4,028,789 | * | 6/1977 | Loch . |
| 4,709,943 | * | 12/1987 | Yoshimura et al. .................. 280/751 |
| 4,896,898 | * | 1/1990 | Lenzen et al. . |
| 4,951,963 | * | 8/1990 | Behr et al. ............................ 280/753 |
| 5,002,308 | * | 3/1991 | Lenzen et al. . |
| 5,145,209 | | 9/1992 | Lenzen . |
| 5,181,737 | * | 1/1993 | Lenzen et al. . |
| 5,536,043 | * | 7/1996 | Lang et al. ........................... 280/753 |
| 5,755,457 | | 5/1998 | Specht . |
| 5,775,729 | * | 7/1998 | Schneider et al. ............... 280/753 X |
| 5,816,613 | * | 10/1998 | Specht, et al. ........................ 280/753 |
| 5,931,493 | | 8/1999 | Sutherland . |
| 6,032,978 | * | 3/2000 | Spencer et al. .................. 280/753 X |
| 6,131,950 | * | 10/2000 | Schroter ................................ 280/753 |

* cited by examiner

Primary Examiner—Brian L. Johnson
Assistant Examiner—Bryan Fischmann
(74) Attorney, Agent, or Firm—Tarolli, Sundheim, Covell, Tummino & Szabo L.L.P.

(57) ABSTRACT

An apparatus (10) for helping to protect an occupant of a vehicle comprises a knee bolster (20) for engaging at least one leg of the occupant to restrain the occupant. The knee bolster (20) comprises a metal tube (50) having a collapsed condition and an expanded condition. The metal tube (50) when in the expanded condition positions the knee bolster (20) to help protect the vehicle occupant. The apparatus (10) also comprises a pyrotechnic transfer line (60, 62, 64) extending within the collapsed metal tube (50). The pyrotechnic transfer line (60, 62, 64) when ignited generates fluid under pressure in the metal tube to expand the metal tube from the collapsed condition to the expanded condition. The apparatus (10) further comprises an igniter (70) for igniting the pyrotechnic transfer line (60, 62, 64).

8 Claims, 2 Drawing Sheets

ACTUATABLE KNEE BOLSTER

BACKGROUND OF THE INVENTION

1. Technical Field

The present invention relates to an apparatus for helping to protect an occupant of a vehicle, and relates particularly to an apparatus including a knee bolster movable from a stored position to a blocking position.

2. Description of the Prior Art

Actuatable vehicle occupant knee bolsters are known in the art. Such a knee bolster is located at a lower portion of a vehicle instrument panel and is movable from a stored position to a blocking position in response to detection of a vehicle crash condition. The knee bolster can help to prevent the vehicle occupant from "submarining" underneath an inflated air bag. Knee bolster systems have been developed that use an inflatable device, such as an air bag, for moving the knee bolster.

Also known in the art is a device known as a pyrotechnic transfer line, or gas generating linear pyrotechnic element. This device is an elongate assembly comprising three strands of glass fiber that are impregnated with an explosive material and enclosed in a plastic sleeve. It is known to use a pyrotechnic transfer line as an ignition device, or fuse, for an actuatable device such as an air bag inflator. It is also known to use a pyrotechnic transfer line as a gas generating device for a pretensioner or a side curtain. Such uses are shown in U.S. Pat. Nos. 5,145,209 and 5,755,457.

SUMMARY OF THE INVENTION

The present invention is an apparatus for helping to protect an occupant of a vehicle. The apparatus comprises a knee bolster for engaging at least one leg of a vehicle occupant to restrain the occupant. The knee bolster comprises a metal tube having a collapsed condition and an expanded condition. The metal tube when in the expanded condition positions the knee bolster to help protect the vehicle occupant. The apparatus also comprises a pyrotechnic transfer line extending within the collapsed metal tube. The pyrotechnic transfer line when ignited generates fluid under pressure in the metal tube to expand the metal tube from the collapsed condition to the expanded condition. The apparatus further comprises an igniter for igniting the pyrotechnic transfer line.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF AN EMBODIMENT OF THE INVENTION

Figure 1:
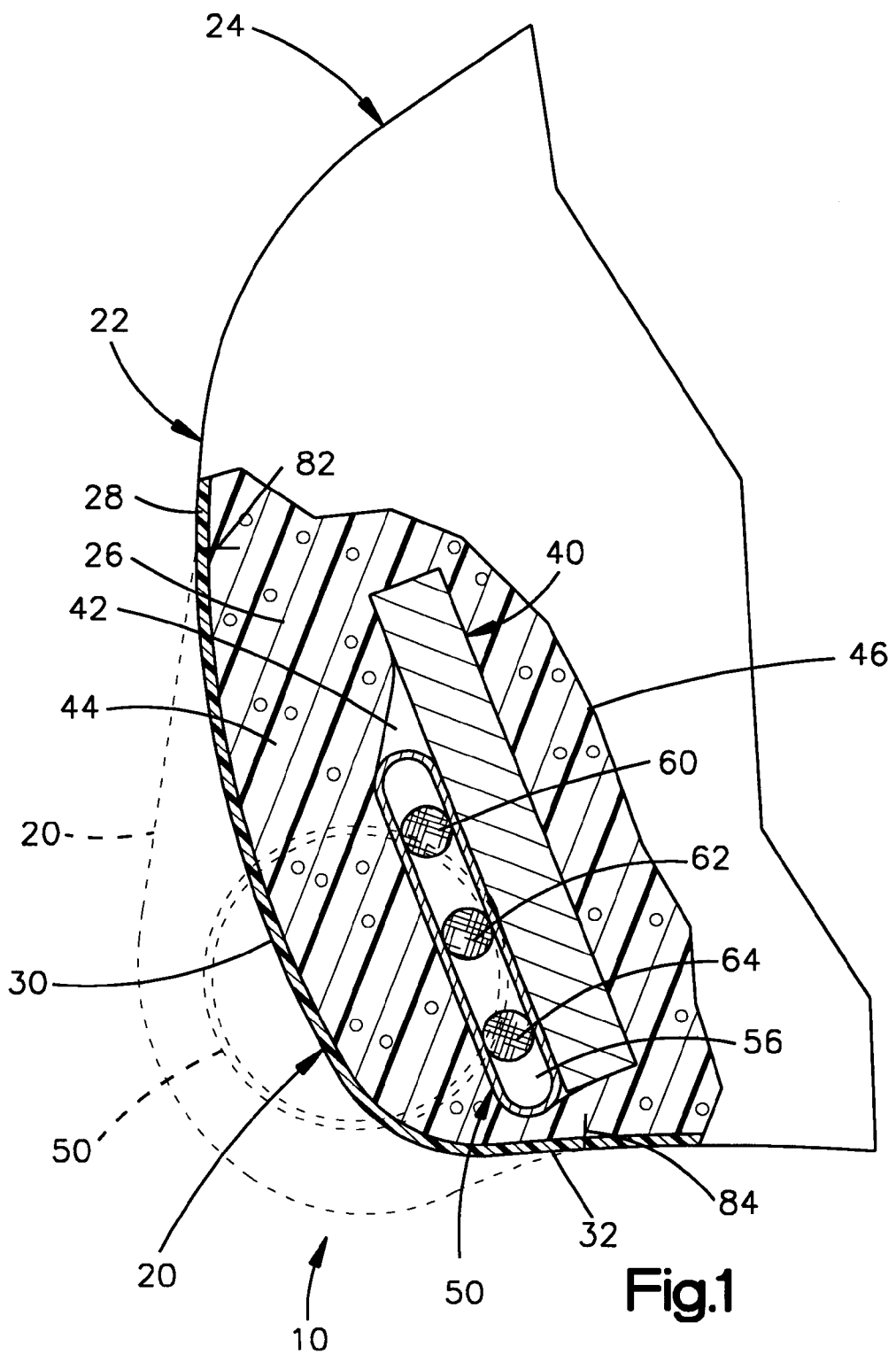
FIG. 1 is a schematic view, partially in section, of a vehicle occupant protection apparatus in accordance with the present invention, including a knee bolster shown in solid lines in a stored condition and in dashed lines in a blocking condition.
Figure 2:
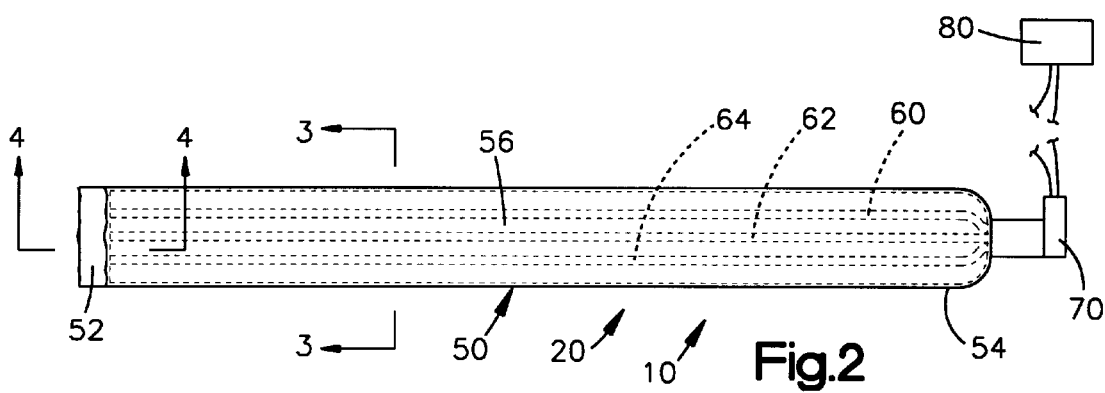
FIG. 2 is an elevational view of a portion of the knee bolster of FIG. 1.

The present invention relates to an apparatus for helping to protect an occupant of a vehicle. In particular, the present invention relates to a vehicle occupant protection apparatus including a knee bolster movable from a stored position to a blocking position. As representative of the present invention, FIG. 1 illustrates an apparatus 10.

The apparatus 10 includes a knee bolster 20. The knee bolster 20 is formed as a lower portion 22 of a vehicle instrument panel 24. The lower portion 22 of the instrument panel 24 is the portion of the instrument panel that a vehicle occupant's knees would contact were the occupant to slide forward from a seated position to contact the instrument panel.

The knee bolster 20 includes part of the vehicle instrument panel 24 such as a trim pad. The knee bolster 20 is made from a relatively soft material such as a resilient foam material 26 covered by a skin 28. The knee bolster 20 has an outer side surface 30 that is presented rearward in the vehicle, that is, in a direction toward a vehicle occupant. The knee bolster 20 also has a lower side surface 32.

A support member illustrated schematically at 40 is located in the instrument panel 24. The support member 40 is illustrated as being made from metal but could, alternatively, be made from a stiff plastic or other material. An opening 42 is formed in the knee bolster 20 between the support member 40 and the outer side surface 30. The opening 42 extends in a direction generally parallel to the outer side surface 30 of the bolster 20. The opening 42 is located about one to two inches away from (inward of) the outer side surface 30. The portion of the bolster 20 located between the opening 42 and the outer side surface 30 is a movable portion 44 of the bolster. A fixed portion 46 of the bolster 20 is located inward of the opening 42.

The knee bolster 20 includes a metal tube 50. The metal tube 50 is located in the opening 42 in the bolster 20. The tube 50 is preferably made from low carbon steel having good yield properties. The tube 50 as illustrated in FIG. 1 is in a collapsed condition in the bolster 20. When first made, the tube 50 is in an expanded condition and has a circular cross-sectional configuration as shown in dashed lines in FIG. 3. The tube 50 has first and second opposite end portions 52 and 54 and a central chamber 56.

The apparatus 10 includes at least one pyrotechnic transfer line, or gas generating linear pyrotechnic element. In the illustrated embodiment, three pyrotechnic transfer lines 60, 62 and 64 are provided. Each one of the three pyrotechnic transfer lines 60, 62 and 64 is a known device comprising strands of glass fiber impregnated with an explosive material, as described in the above-mentioned U.S. Pat. No. 5,145,209. The strands are enclosed in a plastic sleeve. The pyrotechnic transfer line material is available commercially from Explosive Technology, Inc., Fairfield, Calif., under the brand name ITLX. Pyrotechnic transfer lines suitable for use in the apparatus 10 are also available from other vendors.

Figure 3:
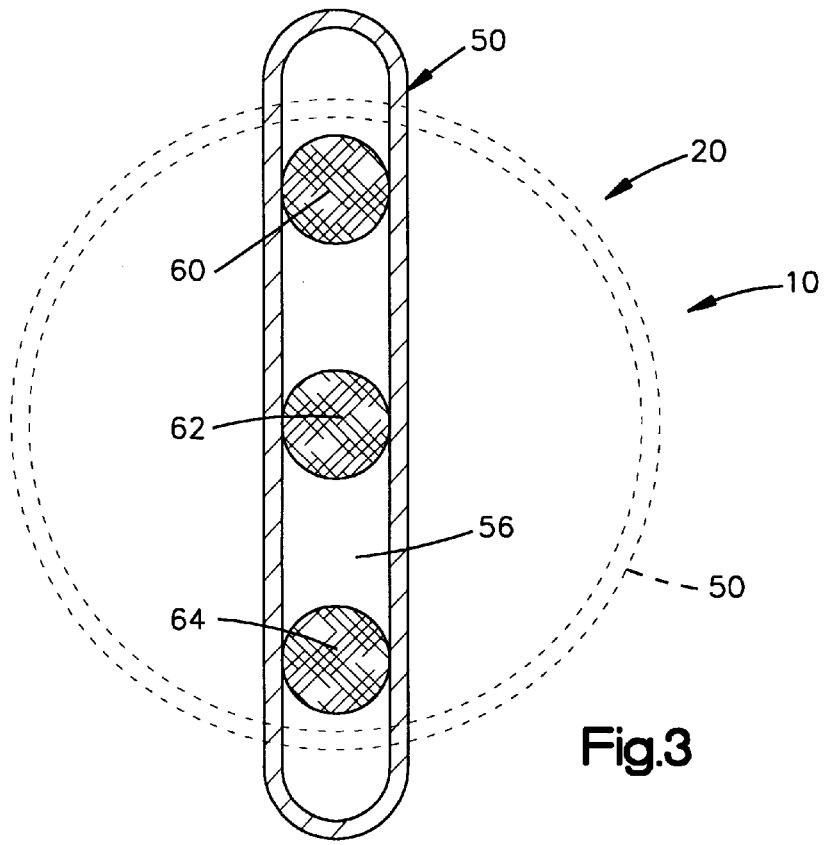
FIG. 3 is a sectional view taken along line 3—3 of FIG. 2.
Figure 4:
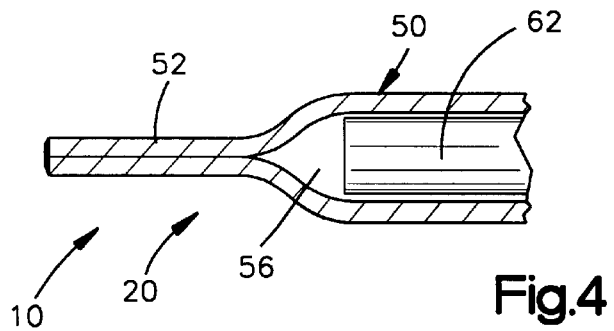
FIG. 4 is a sectional view taken along line 4—4 of FIG. 2.

The pyrotechnic transfer lines 60, 62 and 64 are inserted into the central chamber 56 in the metal tube 50 when the metal tube is in the expanded condition shown in dashed lines in FIG. 3. The metal tube 50 is then deformed into the collapsed condition shown in FIG. 1 and in solid lines in FIG. 3.

After the tube 50 is collapsed with the pyrotechnic transfer lines 60–64 in it, the first end portion 52 of the metal tube is welded shut. An igniter 70 is attached to the second end portion 54 of the metal tube 50. The igniter 70 is a known device that generates heat and pressure for igniting the pyrotechnic transfer lines 60–64. The igniter 70 is sealed to the second end portion 54 of the collapsed metal tube 50.

The collapsed metal tube 50 is located in the opening 42 in the bolster 20. The metal tube 50 may be insert molded in the bolster 20, with the opening 42 being formed in situ. Alternatively, the metal tube 50 may be inserted into an opening 42 that is previously formed in the bolster 20. The bolster 20 may alternatively comprise a separate movable portion 44 secured to a fixed portion 46, with the metal tube 50 being secured between them and the opening 42 comprising the space between them.

The igniter 70 is electrically connected to an actuation circuit in the vehicle shown schematically at 80. The actuation circuit 80 includes a crash sensor, such as an inertia switch or an accelerometer, and a controller. Upon detection of a crash condition requiring occupant protection, as sensed by the crash sensor, the controller controls the actuation circuit 80 so that the actuation circuit sends an electric signal to the igniter 70 to actuate the igniter.

When the igniter 70 is actuated, it emits combustion products including heat and a shock wave. The pyrotechnic transfer lines 60–64 are ignited by the combustion products of the igniter 70. The pyrotechnic transfer lines 60–64 generate gas under pressure in the chamber 56 in the collapsed metal tube 50. The force of the pressurized gas causes the collapsed metal tube 50 to expand and regain its original circular cross-sectional configuration.

The expansion of the metal tube 50 occurs rapidly, generally within about 5 milliseconds. As the metal tube 50 expands, the support member 40 resists expansion of the metal tube inward into the instrument panel 24. Therefore, the metal tube 50 expands outwardly, that is, in a direction toward the outer side surface 30 of the knee bolster 20. The expansion of the metal tube 50 forces the movable portion 44 of the bolster 20 away from the fixed portion 46 of the bolster, in a direction toward the vehicle occupant compartment.

The knee bolster 20 moves from the stored condition shown in solid lines in FIG. 1 to a blocking position as shown in dashed lines in FIG. 1. The knee bolster 20, when in the blocking position, is positioned to contact the knees of a vehicle occupant and block further movement of the vehicle occupant in a forward direction in the vehicle. This blocking action can help to protect the vehicle occupant by preventing contact between the vehicle occupant and the instrument panel 24, and by preventing the vehicle occupant from "submarining" underneath an inflated air bag.

The diameter of the metal tube 50 determines how far the movable portion 44 of the bolster 20 can move. The diameter of the tube 50 is generally equal to the amount of bolster movement provided. For example, expansion of a four inch diameter metal tube 50 will cause the movable part 44 of the bolster 20 to move about four inches away from the fixed part 46 of the bolster. Metal tubes having a diameter of from one-half inch to four inches or more can be used.

The wall thickness of the material of the metal tube 50 depends on the amount of pressure to be generated within the tube. The tube 50 can have a wall thickness in the range of from one half millimeter thick to four millimeters thick.

The bolster 20 shown in FIG. 1 includes a hinge line indicated schematically at 82, and a tear seam indicated schematically at 84. The hinge line 82 and tear seam 84 can enable additional movement of the movable part 44 of the bolster 20.

From the above description of the invention, those skilled in the art will perceive improvements, changes and modifications. For example, the support member 40 can be eliminated to reduce cost, although possibly providing less movement of the movable part 44 of the bolster 20. Also, the number of pyrotechnic transfer lines used can vary, depending on how much pressure is to be generated within the tube. Such improvements, changes and modifications within the skill of the art are intended to be covered by the appended claims.

Having described the invention, we claim:

1. An apparatus for helping to protect an occupant of a vehicle, said apparatus comprising:

a knee bolster for engaging at least one leg of a vehicle occupant to restrain the occupant, said knee bolster comprising a metal tube having a collapsed condition and an expanded condition, said metal tube when in the expanded condition positioning said knee bolster to help protect the vehicle occupant;

a pyrotechnic transfer line extending within said collapsed metal tube, said pyrotechnic transfer line when ignited generating fluid under pressure in said metal tube to expand said metal tube from the collapsed condition to the expanded condition; and an igniter for igniting said pyrotechnic transfer line.

2. An apparatus as set forth in claim 1 comprising a plurality of pyrotechnic transfer lines in said metal tube.

3. An apparatus as set forth in claim 1 wherein said pyrotechnic transfer line comprises a plurality of strands of material impregnated with an explosive material.

4. An apparatus as set forth in claim 1 wherein said metal tube has a circular cross-sectional configuration when in the expanded condition.

5. An apparatus as set forth in claim 1 wherein said knee bolster has a fixed portion and a movable portion, said metal tube being located between said fixed portion of said knee bolster and said movable portion of said knee bolster.

6. An apparatus as set forth in claim 5 wherein said metal tube when expanded from the collapsed condition to the expanded condition moves said movable portion of said knee bolster away from said fixed portion of said knee bolster to position said knee bolster to help protect the vehicle occupant.

7. An apparatus as set forth in claim 1 wherein said metal tube has first and second opposite end portions, said first end portion of said collapsed metal tube being sealed and said igniter being attached to said second end portion of said metal tube.

8. An apparatus as set forth in claim 1 wherein said metal tube has a diameter in the range of from about one-half inch to four inches or more, and a wall thickness in the range of from about one-half millimeter to about four millimeters or more.

* * * * *